(12) United States Patent
White

(10) Patent No.: US 9,170,169 B2
(45) Date of Patent: Oct. 27, 2015

(54) OPEN AREA PLATFORM FOR WIND TUNNEL TESTING

(71) Applicant: Jay White, Portland, OR (US)

(72) Inventor: Jay White, Portland, OR (US)

( * ) Notice: Subject to any disclaimer, the term of this patent is extended or adjusted under 35 U.S.C. 154(b) by 0 days.

(21) Appl. No.: 14/166,787

(22) Filed: Jan. 28, 2014

(65) Prior Publication Data

US 2014/0208839 A1    Jul. 31, 2014

Related U.S. Application Data

(60) Provisional application No. 61/757,628, filed on Jan. 28, 2013.

(51) Int. Cl.
  *G01M 9/04* (2006.01)
  *G01M 9/06* (2006.01)

(52) U.S. Cl.
  CPC .................................... *G01M 9/062* (2013.01)

(58) Field of Classification Search
  CPC ........................................................ G01M 9/04
  USPC ....................................................... 73/862.45
  See application file for complete search history.

(56) References Cited

U.S. PATENT DOCUMENTS

| 4,073,188 A | * | 2/1978 | Slezinger et al. | 73/147 |
| 2010/0175465 A1 | * | 7/2010 | Kato et al. | 73/147 |

FOREIGN PATENT DOCUMENTS

DE   102011085640 A1  *  5/2013

OTHER PUBLICATIONS

Lyons, JT, "A Day in the Life of a Wind Tunnel," http://www.slowtwitch.com/Tech/A_Day_in_the_Life_of_a_Wind_Tunnel_2198.html (Jul. 13, 2011).

* cited by examiner

*Primary Examiner* — Lisa Caputo
*Assistant Examiner* — Jamel Williams
(74) *Attorney, Agent, or Firm* — Klarquist Sparkman, LLP

(57) ABSTRACT

An open area platform for supplementing operation of a wind tunnel balance, comprises a platform body and platform adapters. The platform adapter members have first ends and second ends. The first ends are configured to contact the platform body and the second ends are designed to be operatively coupled with the wind tunnel's balance. As a result, any load on the platform body is configured to be transmitted through the platform adapter members and measured by the wind tunnel balance. Methods of using the open area platform, including for the testing of athletes and their equipment, are also disclosed.

18 Claims, 6 Drawing Sheets

OPEN AREA PLATFORM FOR WIND TUNNEL TESTING

CROSS REFERENCE TO RELATED APPLICATION

This application claims the benefit of U.S. Provisional Patent Application No. 61/757,628, filed Jan. 28, 2013, which is hereby incorporated by reference.

FIELD

Wind tunnel testing is now a well-known method for evaluating aerodynamic drag and forces on objects, including aircraft, motor vehicles, buildings and, more recently, individuals and their equipment as configured for competing in timed sporting events (such as cycling, skating and skiing, to name just a few examples). Established wind tunnel fixtures are adequate, but do not present enough flexibility, such as to allow individuals to try different positions in real time testing as well as to allow for the testing of groups of multiple individuals (such as cycling or skating formations).

SUMMARY

Described herein are implementations of a new open area platform and methods for adapting a conventional wind tunnel arrangement to address some of its shortcomings.

According to a first implementation, an open area platform for supplementing operation of a wind tunnel balance comprises a platform body coupleable to wind tunnel's balance. In one implementation, there are platform adapter members having first ends and second ends, with the first ends being configured to contact the platform body and the second ends being operatively coupled with the wind tunnel balance. As a result, any load on the platform body is configured to be transmitted through the platform adapter members and measured by the wind tunnel balance.

The platform adapter members can be configured to position the platform body at a height spaced above a wind tunnel balance work surface. The second ends of the platform adapter members can be designed to extend through openings in a wind balance work surface to connect to the wind tunnel balance.

In one implementation, there are at least two platform adapter members. In another implementation, there are at least four platform adapter members.

The open area platform can comprise platform adapter member mounts attached to a side of the platform body that is configured to face the wind tunnel balance. The platform adapter member mounts can comprise base flanges attached to a lower side of the platform body with flanges. The platform adapter members can comprise tubular members that are threadedly connectible to the base flanges.

The open area platform can comprise an upper surface, a lower surface, and a forward surface extending between the upper and lower surface and configured to face a moving air stream in the wind tunnel. The wind tunnel balance can be calibrated to zero out drag produced by the open area platform.

In one implementation, the open area platform can define an open area sufficiently large to support at least one skier. In another implementation, the open area platform can define an open area sufficiently large to support at least three bicycles arranged in a riding formation.

In one implementation, the open area platform provides a support area for supporting wind tunnel test subjects without being mechanically restrained to the platform.

In one implementation, the forward surface is curved. In one implementation, the upper surface and the lower surface are smooth.

In one implementation, the platform has a pair of opposing curved end surfaces and a pair of generally straight opposing side surfaces extending between the curved end surfaces.

According to a method implementation, a method of measuring drag on an athlete in a wind tunnel comprises providing a platform defining an open area sufficient to accommodate the athlete and the athlete's equipment, coupling the platform to the wind tunnel's balance, generating an air flow past within the tunnel and directed toward the athlete and the athlete's equipment and measuring the load exerted on the platform by the athlete, the athlete's equipment under the action of the air flow.

The method can include calculating a baseline drag of the platform and subtracting the baseline drag from the load exerted by the platform, the athlete, the athlete's equipment and the action of the air flow.

The method can include measuring the load for multiple different positions of the athlete.

The method can include measuring the load in real time while the athlete and the athlete's equipment move through a sequence of different positions in real time.

These and other implementations are described below with reference to the following drawings.

DESCRIPTION

Figure 1:
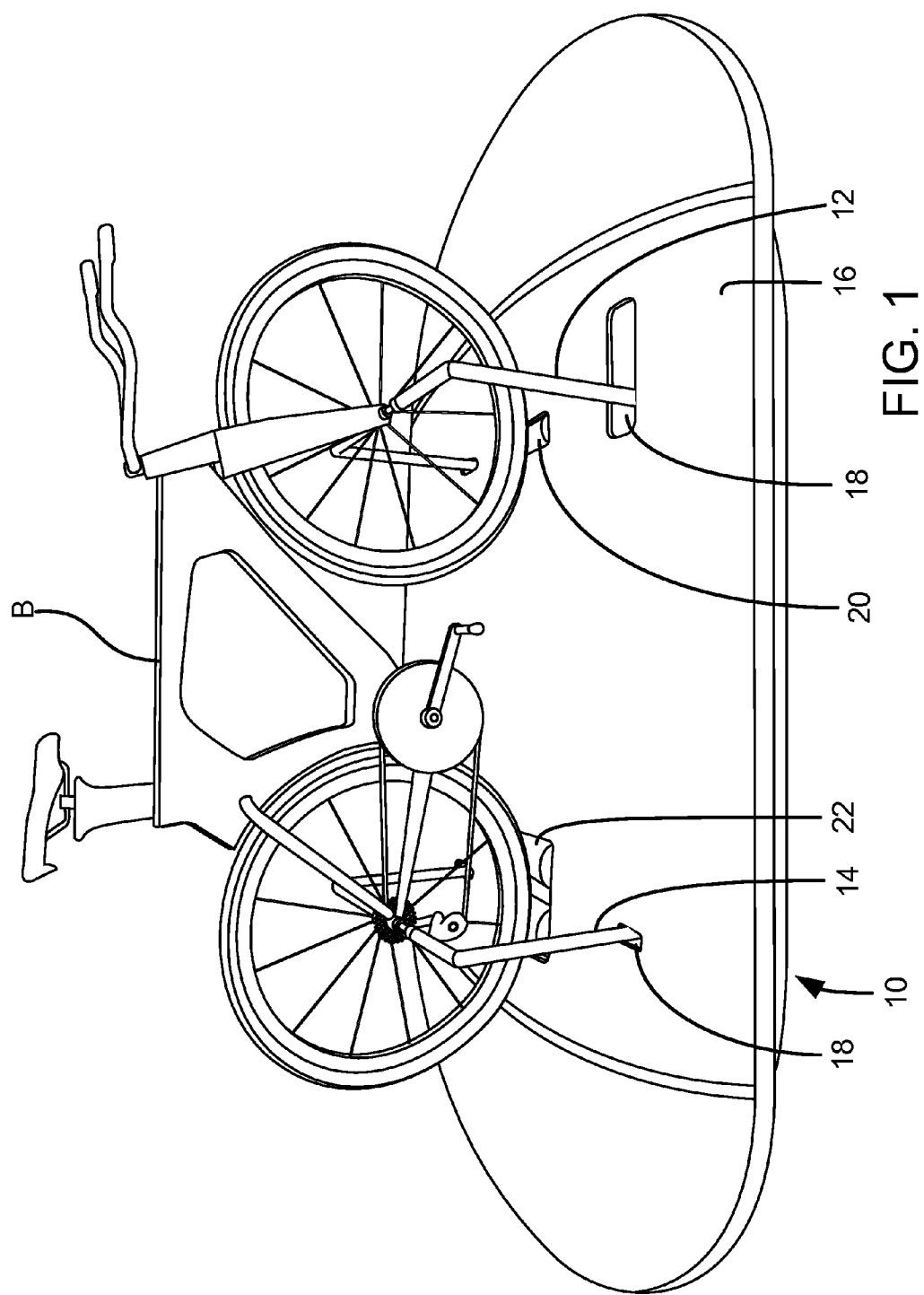
FIGS. 1 and 2 are side elevation and end elevation views of a conventional wind tunnel balance having a work surface and illustrating a bicycle supported on the work surface.
Figure 2:
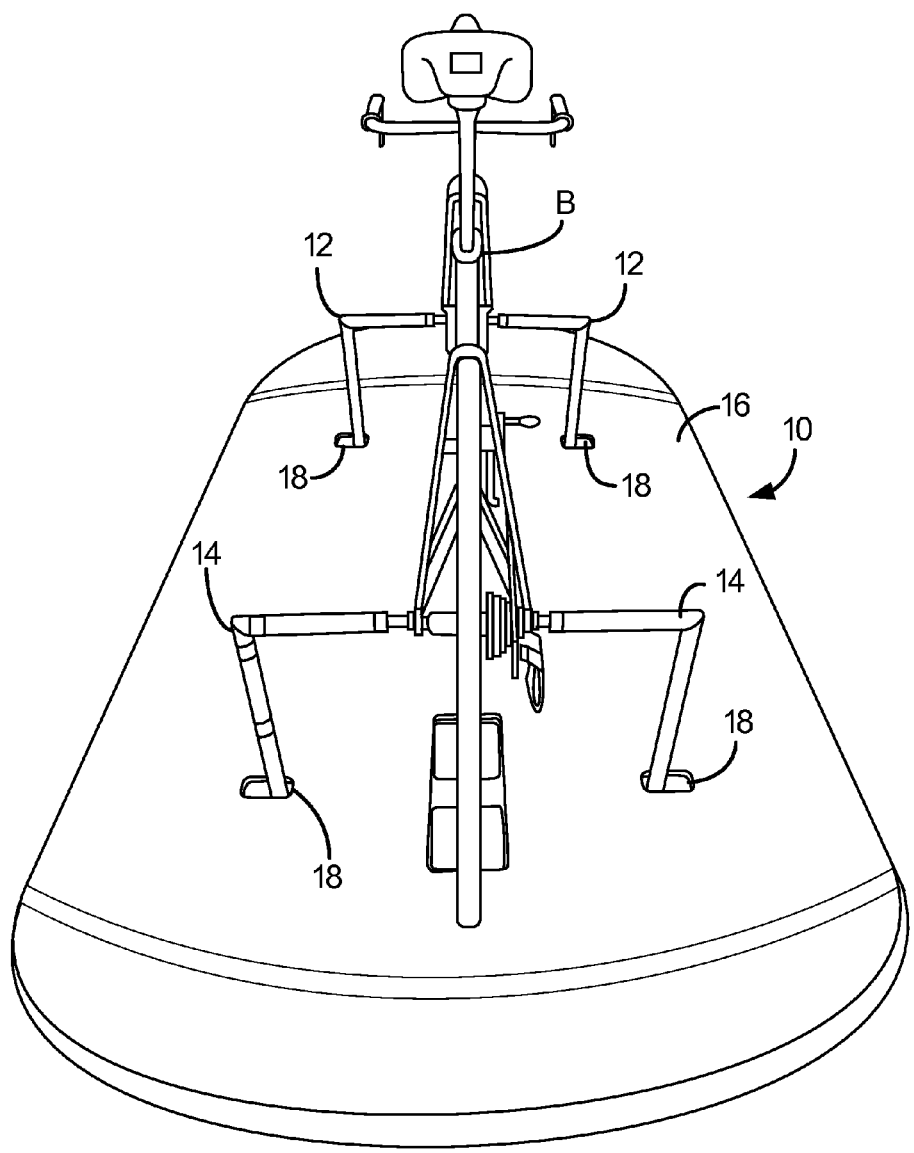

Referring to FIGS. 1 and 2, a conventional wind tunnel balance 10 is shown with a bicycle B mounted for testing in a wind tunnel. The bicycle B is supported above a wind tunnel balance work surface 16 by a pair of front wheel supports 12 and a pair of rear wheel supports 14. The front wheel supports 12 are coupled to the bicycle's front wheel axle in the area of the front fork ends. The rear wheel supports 14 are coupled to the bicycle's rear wheel axle in the area of the rear dropouts. The supports 12, 14 extend through openings in the surface 16 to connect to the wind tunnel balance 10.

The wind tunnel balance measures aerodynamic drag through forces transmitted to the balance from an air stream in the tunnel such as one directed from right to left in FIG. 1 that impinges on the bicycle, which is in turn transmitted through the supports 12, 14 to the balance. Drag produced by the supports 12, 14, the wind tunnel balance work surface 16 and any other objects that are not the subject of testing is subtracted to yield the drag for the bicycle alone.

Testing of only the bicycle B as shown is sometimes conducted, such as might be useful to test its aerodynamic drag vs. a different bicycle or to test the same bicycle with different equipment configurations, such as, e.g., with different wheel sets. Many tests, however, include the combination of the bicycle and a mounted rider because the rider's drag is the greater component of the overall drag, and changes in the rider's position, helmet and clothing can yield significant reductions in drag.

As shown, the bicycle's front wheel is positioned in contact with a front wheel roller 20 that protrudes through an opening in the surface 16. Similarly, the rear wheel is positioned to contact a pair of rollers 22 that also protrude through an opening. The front wheel roller 20 and the rear wheel rollers 22 allow the bicycle to be "ridden in place" if desired at a selected speed during testing. Typically, data such as the rider's cadence, speed, power, etc. are collected during testing.

Figure 3:
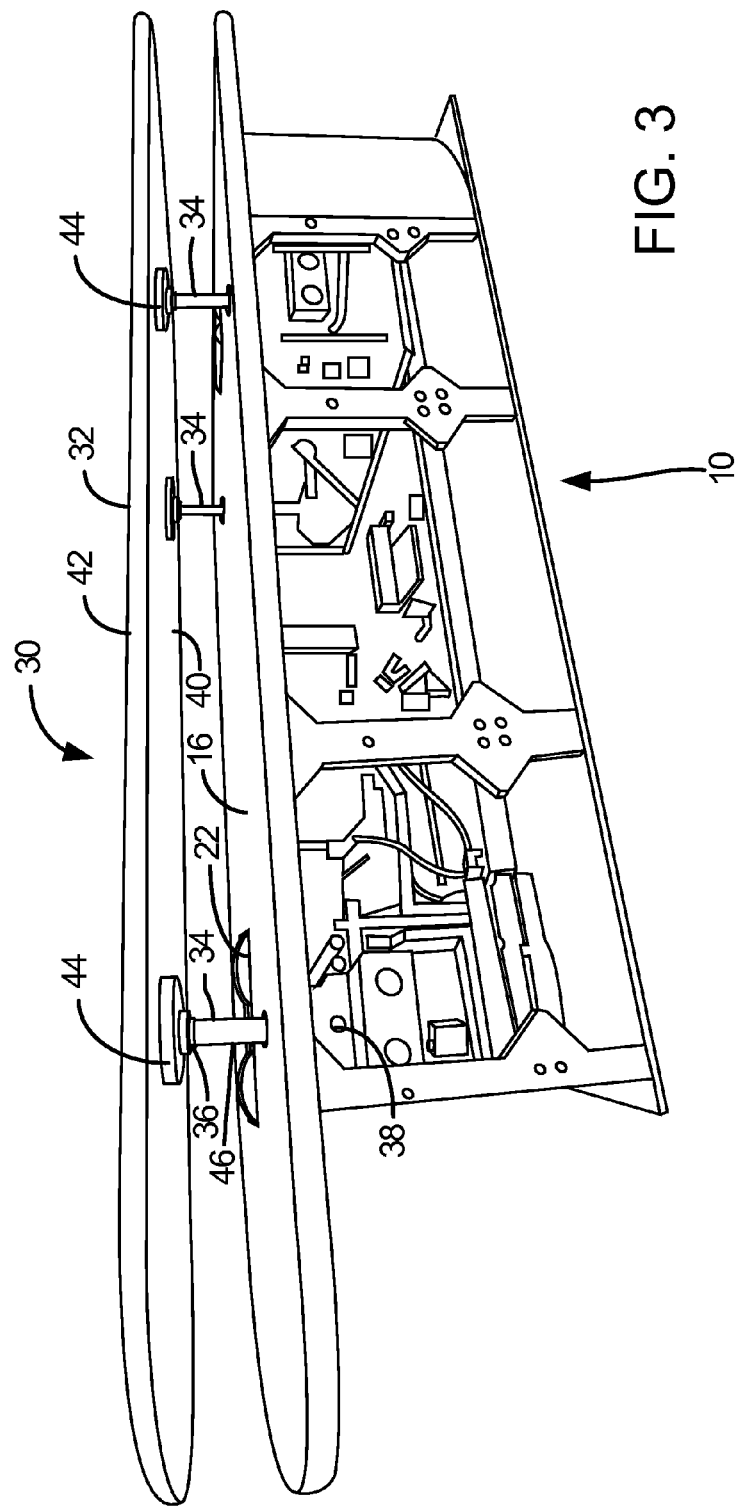
FIG. 3 is a side elevation view of a part of a wind tunnel balance having a new platform according to one implementation mounted above the work surface.
Figure 4:
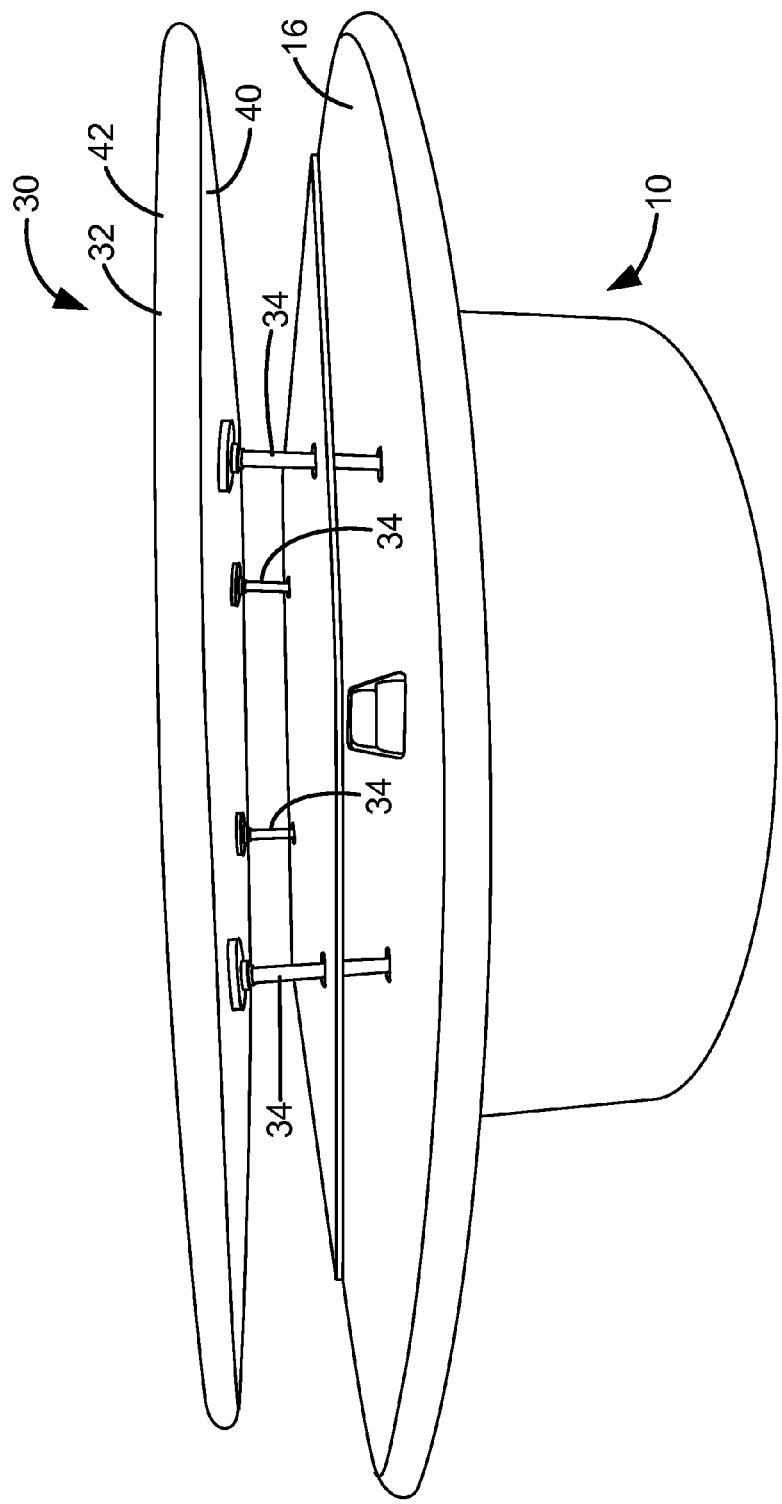
FIG. 4 is an end elevation view of the wind tunnel balance and new platform of FIG. 3.
Figure 5:
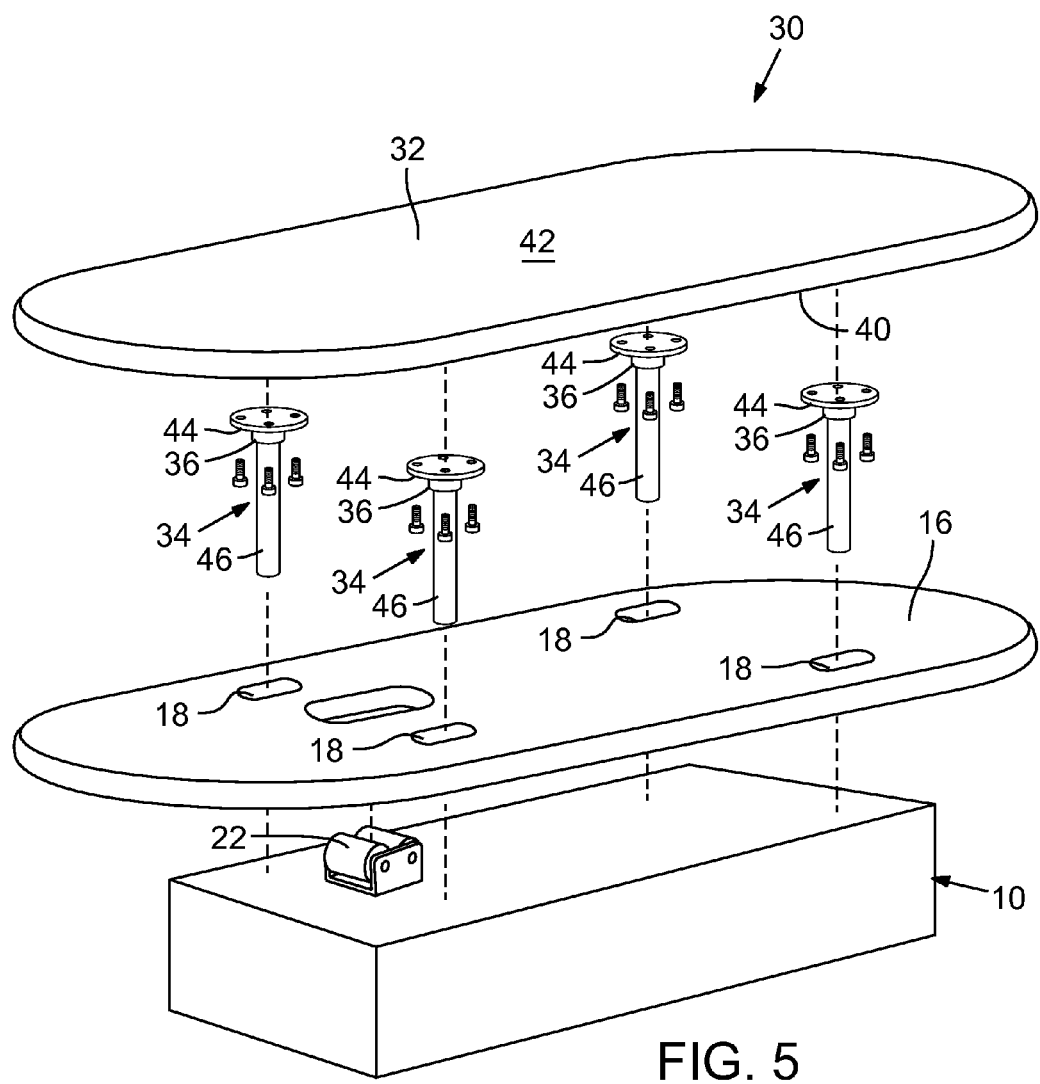
FIG. 5 is an exploded perspective view of the new platform, the work surface and the wind tunnel balance.

FIG. 3 is a side elevation view showing a portion of the wind tunnel balance 10 and a portion of a new open area platform 30 mounted above and spaced apart from the surface 16. FIG. 4 is another side elevation view from a different vantage. FIG. 5 is an exploded view of the platform 30 in its relation to the work surface 16 and the balance 10 (which is shown as a "black box" element in FIG. 5).

As shown in FIGS. 3 and 5, the open area platform 30 comprises a separate platform body 32 supported by platform adapter members 34 that are operatively coupled to the wind tunnel balance 10. Specifically, (1) the wheel supports 12, 14 have been removed, (2) upper or first ends 36 of the platform adapter members 34 have been attached to a lower surface 40 of the platform body 32, and (3) the platform 30 has been installed above the work surface 16 with lower or second ends 38 of the platform adapter members 34 extending through the openings 18 for coupling the platform 30 to the wind tunnel balance 10.

It is usually necessary to measure and account for the drag produced by the platform body 32 and platform adapter members 32. This drag is many orders of magnitude less than the drag of a typical athlete and the athlete's equipment. In addition, due to the relatively smooth side profile of the platform 30 that does not undergo abrupt changes, such as in curvature, the variation in the amount of the platform's drag as the direction of the air stream changes is small.

In the illustrated implementation, there are four platform adapter members 34. In other implementations, however, it would be possible to use fewer adapter members (such as one or two such members), or a greater number of members. In the illustrated implementation, each adapter member 34 can be removably attached to the lower surface 40 for convenience. As best seen in FIGS. 3 and 5, each adapter member can comprise a base flange 44 attached to the lower surface 40 with fasteners and a tubular member 46 threadedly received in a central threaded aperture of the base flange 44. In other implementations, the platform could be provided with recesses formed in the lower surface 40 for receiving the upper ends 36, and the platform 30 would remain in the desired position under the action of gravity.

The open area platform 30 provides a large open upper surface 42 upon which equipment for testing can be positioned, and generally without constraint. In the illustrated implementations, there are no dedicated supports mounted to the upper surface 42 requiring test subjects to be positioned at fixed locations on the upper surface (although such supports are possible, and could be removable).

As a result, it is possible to test multiple bicycles (and mounted riders) simultaneously, such as, e.g., to evaluate riding formations. For example, testing can be conducted to evaluate a following rider's drag while directly aligned behind a leading rider (i.e., drafting the leading rider), such as to evaluate the following rider's position or the best following distance relative to a selected speed. In addition, testing could be conducted to test how drag is affected by changes in the relative positioning of riders in an echelon formation where the direction of the air stream is angled relative to the longitudinal axis of the bicycle and the following rider is positioned on the leeward side of, rather than directly behind, the lead rider. If necessary, the multiple bicycles can be supported on the open area platform by rear wheel stands or stationary trainers, which can be zeroed out to eliminate their effects on drag calculations.

Figure 6:
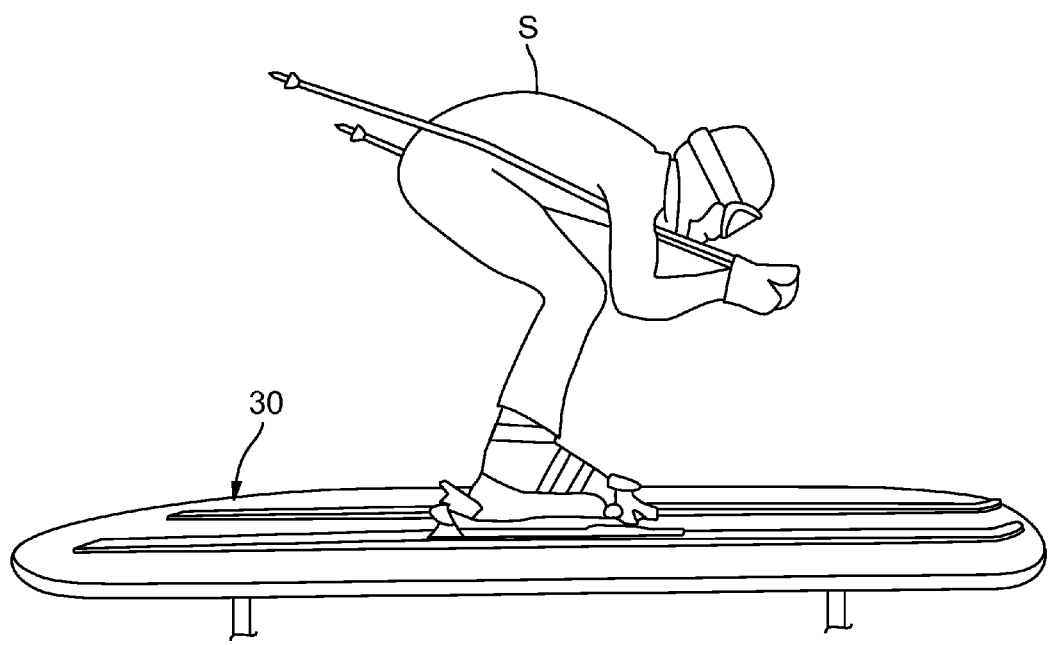
FIG. 6 is a side elevation view of a skier emulating a skiing position while he is supported on the new platform, which is in turn supported on the work surface.

In addition to bicycles, the open area platform 30 allows for testing of other sports-related equipment and other objects. For example, as shown in FIG. 6, a skier S can be tested to evaluate his "tuck" position. Moreover, because the open area platform 30 does not rely on dedicated mounts, etc., that would clutter the open area, the skier S in FIG. 6 is free to move to emulate the position of his body and skis to determine their effect on overall aerodynamic drag. For example, the skier can lean to the right as if making a right turn and position his skis on edge, which changes the aerodynamic drag of the skis and can have a measurable effect in elite competition.

As just one other example, multiple short track speed skaters can use the open area platform 30 to study the effects of their relative positions and determine positive drafting benefits. Overall, testing with the open area platform provides a closer simulation to an actual sport because the athlete has the ability to move through all six degrees of freedom to very nearly the same extents as in a real-world sport scenario.

Wind tunnel testing time is a limited resource, so saving time between testing runs can lead to important savings. The open air platform 30 can be quickly installed and removed so that it can be used in testing directly following a test conducted with the conventional arrangement of FIGS. 1 and 2, and then switched back to the conventional arrangement again. In the illustrated example, it may be necessary only to change over the support members 12, 14 and recalibrate the apparatus when changing arrangements.

In view of the many possible embodiments to which the disclosed principles may be applied, it should be recognized that the illustrated embodiments are only preferred examples and should not be taken as limiting in scope. Rather, the scope of protection is defined by the following claims.

The invention claimed is:

1. An open area platform for supplementing operation of a wind tunnel balance, comprising:
   a platform body;
   platform adapter members having first ends and second ends, wherein the first ends are configured to contact the platform body and the second ends are designed to be operatively coupled with the wind tunnel balance to position the platform body at a height spaced above a wind tunnel balance work surface, wherein any load on the platform body is configured to be transmitted through the platform adapter members and measured by the wind tunnel balance.

2. The open area platform of claim 1, wherein the second ends of the platform adapter members are designed to extend through openings in a wind balance work surface to connect to the wind tunnel balance.

3. The open area platform of claim 1, wherein there are at least two platform adapter members.

4. The open area platform of claim 1, wherein there are at least four platform adapter members.

5. The open area platform of claim 1, further comprising platform adapter member mounts attached to a side of the platform body that is configured to face the wind tunnel balance.

6. The open area platform of claim 5, wherein the platform adapter member mounts comprise base flanges attached to a lower side of the platform body with flanges.

7. The open area platform of claim 6, wherein the platform adapter members comprise tubular members that are threadedly connectible to the base flanges.

8. The open area platform of claim 1, wherein the platform comprises an upper surface, a lower surface, and a forward surface extending between the upper and lower surface and configured to face a moving air stream in the wind tunnel, and wherein the wind tunnel balance can be calibrated to zero out drag produced by the open area platform.

9. The open area platform of claim 1, wherein the platform body defines an open area sufficiently large to support at least one skier.

10. The open area platform of claim 1, wherein the platform body defines an open area sufficiently large to support at least three bicycles arranged in a riding formation.

11. The open area platform of claim 1, wherein the open area platform provides a support area for supporting wind tunnel test subjects without being mechanically restrained to the platform.

12. The open area platform of claim 8, wherein the forward surface is curved.

13. The open area platform of claim 8, wherein the upper surface and the lower surface are smooth.

14. The open area platform of claim 1, wherein the platform has a pair of opposing curved end surfaces and a pair of generally straight opposing side surfaces extending between the curved end surfaces.

15. An open area platform for supplementing operation of a wind tunnel balance, comprising:
   a platform body;
   a platform adapter members having first ends and second ends, wherein the first ends are configured to contact the platform body and the second ends are designed to be operatively coupled with the wind tunnel balance, the platform adapter members being configured to extend from an underside of the platform body through openings in a work surface of the wind tunnel balance, wherein any load on the platform body is configured to be transmitted through the platform adapter members and measured by the wind tunnel balance.

16. A method of measuring drag on an athlete in a wind tunnel, comprising:
   providing a platform defining an open area sufficient to accommodate the athlete and the athlete's equipment;
   coupling the platform to the wind tunnel's balance;
   generating an air flow within the tunnel and directed toward the athlete and the athlete's equipment; and
   measuring the load exerted on the platform by the athlete and the athlete's equipment under the action of the air flow for multiple different positions of at least the athlete.

17. The method of claim 16, further comprising calculating a baseline drag of the platform and subtracting the baseline drag from the load exerted by the platform, the athlete, the athlete's equipment and the action of the air flow.

18. The method of claim 16, further comprising measuring the load in real time while the athlete moves through a sequence of different positions in real time.

* * * * *